(12) United States Patent
Zeeb et al.

(10) Patent No.: US 9,539,656 B2
(45) Date of Patent: Jan. 10, 2017

(54) INSERT AND CLAMPING HOLDER HAVING FOUR-POINT CONTACTS

(75) Inventors: Rudi Zeeb, Tübingen (DE); Christian Bandura, Karlsruhe (DE)

(73) Assignee: Walter AG, Tübingen (DE)

( * ) Notice: Subject to any disclaimer, the term of this patent is extended or adjusted under 35 U.S.C. 154(b) by 330 days.

(21) Appl. No.: 14/239,629

(22) PCT Filed: Sep. 12, 2012

(86) PCT No.: PCT/EP2012/067788
§ 371 (c)(1),
(2), (4) Date: Jun. 9, 2014

(87) PCT Pub. No.: WO2013/041420
PCT Pub. Date: Mar. 28, 2013

(65) Prior Publication Data
US 2015/0086282 A1    Mar. 26, 2015

(30) Foreign Application Priority Data
Sep. 19, 2011   (DE) .................. 10 2011 053 760

(51) Int. Cl.
  *B23B 27/04*   (2006.01)
  *B23C 5/22*    (2006.01)
  (Continued)
(52) U.S. Cl.
  CPC .............. *B23C 5/22* (2013.01); *B23B 27/04* (2013.01); *B23B 29/043* (2013.01); *B23B 27/086* (2013.01); *B23B 29/14* (2013.01); *B23B 2205/02* (2013.01)
(58) Field of Classification Search
  CPC .... B23B 2205/02; B23B 27/04; B23B 29/043; B23B 29/14; Y10T 407/1922; Y10T 407/25
  See application file for complete search history.

(56) References Cited

U.S. PATENT DOCUMENTS

| 80,929 A | * | 8/1868 | Disston ............. B23B 29/043 83/845 |
| 867,275 A | * | 10/1907 | Hunter ............. B23C 5/2468 407/110 |

(Continued)

FOREIGN PATENT DOCUMENTS

| CN | 201572932 | 9/2010 | |
| DE | 3313693 A1 | * 10/1984 | ............. B23B 27/16 |

(Continued)

OTHER PUBLICATIONS

German Search Report in Application No. 10 2011 053 760.0 dated May 21, 2012.

(Continued)

*Primary Examiner* — Daniel Howell
*Assistant Examiner* — Ryan Rufo
(74) *Attorney, Agent, or Firm* — Morgan, Lewis & Bockius LLP

(57) ABSTRACT

Clamping holder for cutting inserts has a rigid holding part and a clamping finger elastically movable with respect to the rigid holding part that define opposite sides of a substantially U-shaped recess for receiving a cutting insert. One of these two sides has first and second spaced-apart contact points for one side of a cutting insert and the opposite side has a third contact point. A stop for limiting the insertion depth of the cutting inset into the recess is provided inside the recess. That side of the cutting insert that has the third contact point is additionally assigned the stop, which is configured such that it simultaneously acts as a further, fourth lateral contact point opposite the first and second contact points and as a stop for limiting the insertion depth of the cutting insert.

7 Claims, 3 Drawing Sheets

(51) Int. Cl.
*B23B 29/04* (2006.01)
*B23B 27/08* (2006.01)
*B23B 29/14* (2006.01)

(56) References Cited

U.S. PATENT DOCUMENTS

| | | | | |
|---|---|---|---|---|
| 1,455,968 A | * | 5/1923 | Proctor | B23D 61/16 83/845 |
| 1,608,182 A | * | 11/1926 | Pospiech | B23D 61/06 83/841 |
| 4,417,833 A | | 11/1983 | Wertheimer | |
| 4,558,974 A | * | 12/1985 | Pano | B23B 27/045 407/110 |
| 5,161,920 A | | 11/1992 | Zinner | |
| 5,719,859 A | | 2/1998 | Kobayashi et al. | |
| 5,743,680 A | * | 4/1998 | Von Haas | B23B 27/04 407/110 |
| 5,803,675 A | * | 9/1998 | Von Haas | B23B 27/04 407/107 |
| 5,829,924 A | | 11/1998 | Oshnock et al. | |
| 6,579,044 B1 | * | 6/2003 | Trenkwalder | B23B 27/04 407/110 |
| 8,647,029 B2 | * | 2/2014 | Hecht | B23B 27/045 407/107 |
| 2002/0081165 A1 | * | 6/2002 | Hecht | B23C 5/08 407/110 |
| 2002/0176754 A1 | * | 11/2002 | Barazani | B23B 27/04 407/42 |
| 2004/0151551 A1 | | 8/2004 | Oettle | |
| 2005/0207854 A1 | * | 9/2005 | Hecht | B23B 27/04 407/117 |
| 2006/0062640 A1 | * | 3/2006 | Kugler | B23B 27/04 407/117 |
| 2013/0167345 A1 | * | 7/2013 | Hecht | B23B 29/04 29/267 |

FOREIGN PATENT DOCUMENTS

| | | | | |
|---|---|---|---|---|
| DE | 3319799 A1 | * | 12/1984 | B23B 27/04 |
| DE | 39 09 358 | | 3/1989 | |
| DE | 82 14 831 U1 | | 8/1991 | |
| DE | 0 851 796 | | 1/1999 | |
| DE | 696 08 965 | | 12/2000 | |
| DE | 10 2004 033 929 | | 1/2006 | |
| DE | 102008005789 B3 | * | 6/2009 | B23B 29/043 |
| EP | 0222951 A1 | * | 5/1987 | B23B 27/04 |
| EP | 1 205 273 | | 5/2002 | |
| EP | 2 082 820 | | 7/2009 | |
| JP | 01-115504 A | * | 5/1989 | B23B 27/04 |
| JP | 02-106204 A | * | 4/1990 | B23B 27/04 |
| WO | 03/004203 | | 1/2003 | |

OTHER PUBLICATIONS

International Search Report and Written Opinion in PCT/EP2012/067788 dated Dec. 17, 2012.
English Translation of Office Action for Chinese Application No. 201280036490.X dated Apr. 29, 2015.
International Preliminary Report on Patentability dated Mar. 25, 2014, for International Application No. PCT/EP2012/067788.

* cited by examiner

INSERT AND CLAMPING HOLDER HAVING FOUR-POINT CONTACTS

The present invention relates to a clamping holder for cutting inserts, with a rigid holding part and a clamping finger, which is resiliently movable relative to the rigid holding part, the holding part and clamping finger defining opposing sides of a substantially U-shaped recess to receive a cutting insert, and a stop to limit the insertion depth of the cutting insert into the recess being provided in the interior of the recess. The side opposing the clamping finger in this case has at least two contact points spaced apart from one another or a correspondingly extended contact face, which comprises at least two such contact points, while the clamping finger has a contact point or a less extended contact face to engage with a cutting insert.

Corresponding clamping holders for cutting inserts, in particular for so-called inserts/insert plates have been known for a long time. These clamping holders are generally narrow plates or plate-shaped elements, the thickness of these plates or plate-shaped elements being smaller than the length of a main cutting edge of a corresponding insert. This main cutting edge is in turn formed by the transition or the corner between two edge faces, which (in addition to optionally further edge faces) connect the side faces of the cutting plate or cutting insert to one another. The cutting plate is slightly thickened in the region of the cutting edge.

In this case, one end face of a clamping holder of this type has a recess, in which the insert is received and is firmly held by the clamping finger. The cutting edge of the insert forms the part that projects furthest forward of the tool consisting of the clamping holder and insert and is fed, for example, to a rotating, rotationally symmetrical workpiece in order to cut a groove in the periphery of the workpiece or cut off a portion of the workpiece. In this case, the cutting insert penetrates, with its cutting edge leading, into the workpiece and the clamping holder configured in the form of a narrow plate or blade, the thickness of which is also smaller than the length of the cutting edge, can then penetrate into the groove already produced by the insert.

Corresponding clamping holders may, however, also be provided on rotating tools, for example a side milling cutter, the recesses being provided radially along the periphery of a rotatable disc in a case such as this, and corresponding slots, which also extend radially inwardly substantially from the periphery of the plate, suitable clamping fingers and portions that are rigid in comparison, being formed.

As the cutting edge of an insert of this type or a corresponding cutting insert in each case comes into contact, as the first and only part, with the workpiece, the portion of the cutting insert having the cutting edge has to project to a certain extent from the clamping holder. During the machining, depending on the type of workpiece, the feed speed of the tool and the machining speed, high forces act on the cutting insert, which, as the cutting edge projects slightly from the clamping holder, also exert a certain torque on the cutting insert, the effective torque being defined by the force acting on the cutting edge or cutting face, and the lever, which is defined by the connection of the cutting edge and the abutment point, which is closest to and opposite the cutting edge, of the cutting insert on the clamping holder.

Conventional clamping holders, in this case, generally have three contact points, namely two contact points on the side, which opposes the side on which the cutting edge is formed, which is generally assigned to the rigid holding part, and a contact point on the side of the cutting edge, which is generally formed by one end of the clamping finger, this third contact point generally being located between the first and second contact points relative to a connecting line. The term "contact point", in this case, also comprises more or less extended contact faces. In the context of the present application, a contact face is regarded as a "contact face" when its maximum extent is less than 20% of the maximum extent of a cutting insert or the U-shaped recess.

In addition, also provided in the interior of the recess is a stop, which limits the insertion depth of the cutting insert, for example in that a rear end, which is remote from the cutting edge, of the cutting insert strikes against a stop arranged close to the base of the U-shaped recess. In some cases, the stop is also configured on the clamping finger and can, in particular, also be formed by the free end of the clamping finger, a corresponding step-shaped projection then having to be provided on the cutting insert between the cutting edge and the rear portion received in the U-shaped recess.

While this known, so-called three-point contact generally defines a clear stable position of the cutting insert, under difficult working conditions, i.e. with relatively strong forces acting on the cutting edge, it may nevertheless occur that the cutting insert is tilted in its seat counter to the force exerted by the clamping finger by way of the third contact point. In this case, the cutting insert can be completely released from its seat under some circumstances, but will at least change its position for a short time, so the conditions at the cutting edge change, the cut faces possibly become unclean or else further increased forces occur, which can lead to vibrations and corresponding early wear and also to the tearing of the cutting insert out of its seat or else to a breakage of the cutting insert.

Compared to the prior art, the present invention is based on the object of providing a corresponding clamping holder for cutting inserts, as well as a fitting cutting insert, which are in a position to withstand relatively large cutting forces, to ensure a stable and secure position of the cutting insert in the clamping holder even under difficult conditions, i.e. at large cutting forces, and to reduce vibrations and therefore also premature wear of the cutting insert while a workpiece is being machined.

This object is achieved in that the stop, which is assigned to the side having the third contact point, is configured in such a way that it does not only act as a stop but simultaneously also as a contact point of the side opposing the first and second contact points.

This is achieved, for example, in that the stop has a stop face, which is not arranged, for example, perpendicularly or at a very large angle in relation to the insertion direction of the cutting insert, but is only relatively slightly angled and extends, for example, at an angle between 15 and 50° relative to the insertion direction. A stop face of this type, which is also simultaneously arranged on the side of the U-shaped recess opposing the first and second contact points, effectively leads to a wedge-shaped tapering of the U-shaped recess, which also acts as an effective stop to limit the insertion depth of a cutting insert.

Because of the relatively small angling and the arrangement on the side opposing the first and second contact points, this stop simultaneously also acts, however, as a fourth contact point in addition to the third contact point provided by the clamping finger. In other words, the cutting insert is thus held on both sides by two spaced-apart contact points in each case and can therefore, in contrast to conventional clamping holders, withstand substantially larger torques, such as are caused by cutting forces acting on the cutting edge.

Because of the slight angling of the contact face, an over-determination of the position of the cutting insert is nevertheless avoided, as when introducing the cutting insert into the U-shaped recess (it being understood that the cutting insert has upper and lower sides adapted to the course of the sides of the U-shaped recess), the cutting insert firstly only comes into contact with the first and second and optionally also with the third contact point, while the fourth contact point is simultaneously configured as a stop to limit the insertion depth and thus only comes into contact with the cutting insert on reaching the end position of said cutting insert. Because of the relatively flat angle, by which the stop point is angled in relation to the associated side, this contact point can simultaneously act as a real abutment in relation to torques, which are caused by the occurring cutting force and the effective lever cutting edge first contact point.

The third contact point has a maximum spacing from the first contact point and therefore absorbs corresponding torques without problems.

In one embodiment it is provided that the clamping finger, which forms the side with the third contact point, which opposes the side with the first and second contact points, is separated from the fourth contact point provided on the same side by a slot bringing about the relative mobility of the clamping finger.

The fourth contact point, which is simultaneously a stop, is therefore not part of the movable clamping finger, but assigned to the rigid holding part, so the fourth contact point serving simultaneously as a stop can fulfil its function well as a (non-movable) insertion limitation with a corresponding positional accuracy.

Accordingly, in an embodiment of this type, the side with two contact points is assigned to the rigid holding part.

Furthermore, the stop is configured as a relatively extended stop face or contact face, which also contributes to improving the positional accuracy.

In one embodiment of the invention, one of the two opposing sides of the recess is concave and the other side is convex. In this case, the concave and the convex sides run at least approximately in parallel and, accordingly, the associated sides of a cutting insert also have to be correspondingly concave and convex in order to be able to be inserted in a fitting manner into the U-shaped recess. A curved configuration of this type of the U-shaped recess can contribute to the increase in the pull-out forces, which act under some circumstances on the cutting insert. Moreover this curved configuration allows a more favourable use of the material of the clamping holder if the intention is to avoid excessive protrusions upward or downward with respect to the U-shaped recess.

In the case of a curved configuration of this type of the U-shaped recess, the insertion direction, in relation to which the contact face is angled, can optionally be defined with respect to a tangent to the curved course at the transition to the angling.

Effectively, the stop face, regardless of whether the recess runs in a linear or curved manner, forms a wedge-shaped tapering here of the U-shaped recess on its inner end portion, which simultaneously limits the insertion depth of the cutting insert and also blocks an upward and downward movement of the cutting insert end. Moreover, the U-shaped recess has a substantially constant width and is adapted to the form of the cutting insert.

The associated cutting insert is configured analogously to the recess and has a cutting insert body, which has an upper and lower side, which are configured for engagement with corresponding sides of the U-shaped recess of a clamping holder, a cutting edge on an end of the upper side at its transition to an end face, which connects the upper and lower side to one another, and a stop face on the end opposing the cutting edge, the lower side having two contact points for contact with two corresponding contact points of the U-shaped recess of a clamping holder and a contact point on the opposing side, a stop being provided on the end of the cutting insert located remote from the cutting edge, said stop simultaneously acting as a contact point. This effect as a contact point is also caused here by a slight angling of the contact face in relation to the insertion direction or in relation to the associated upper side of the cutting insert.

The sides of the cutting insert and of the U-shaped recess coming into contact with one another can also define a slightly positive or negative wedge shape. In this case, the wedge shape is designated "positive" when the opening of the U-shaped recess is wider than the part located further inwardly, and is designated "negative" in the reverse case.

The shape of the cutting insert is analogous to the shape of the U-shaped recess, i.e. the cutting insert optionally has concave upper and lower sides, which run at least approximately in parallel and the contact points of the cutting insert, which come into contact with the corresponding contact points of the clamping holder, are distributed in the same manner as in the clamping holder.

In order to obtain defined first and second contact points that are separated from one another, the faces of the cutting insert and the clamping holder, which are associated with one another and have the two contact points, can be configured slightly differently, i.e. one of the two sides can be configured to be slightly set back relative to the other between the two contact points. This ensures that one side of the cutting insert is supported on two points located clearly spaced apart from one another relative to the associated side of the clamping holder.

For example, the lower side of the cutting insert may have a setback portion between the two contact points, it also being possible for this setback portion to be provided on the clamping holder, however.

Further advantages, features and application possibilities of the present invention become clear with the aid of the following description of a preferred embodiment and the associated figures, in which.

Figure 4A:
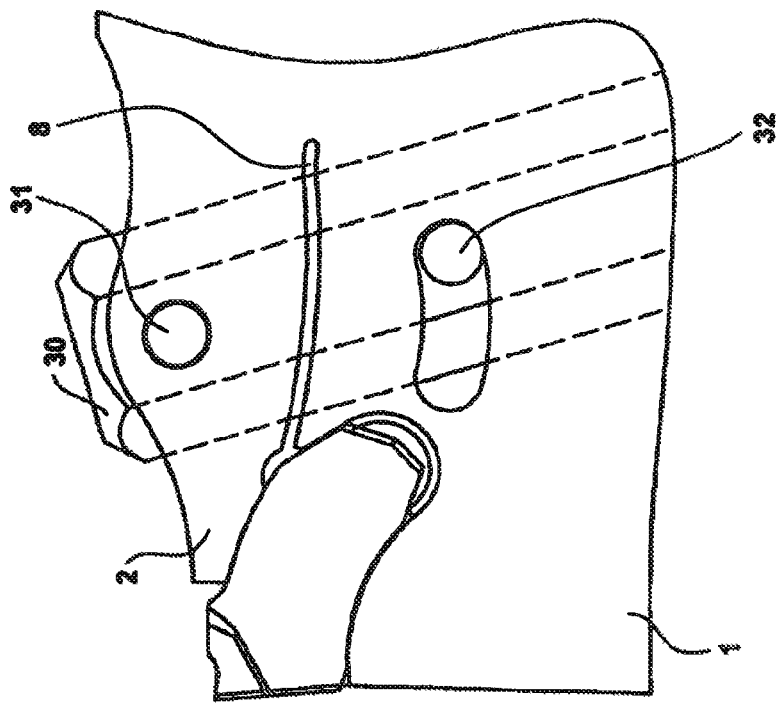

FIG. 4a, b show the insertion of an insert into a clamping holder or the corresponding removal with the aid of a tool.

Figure 1:
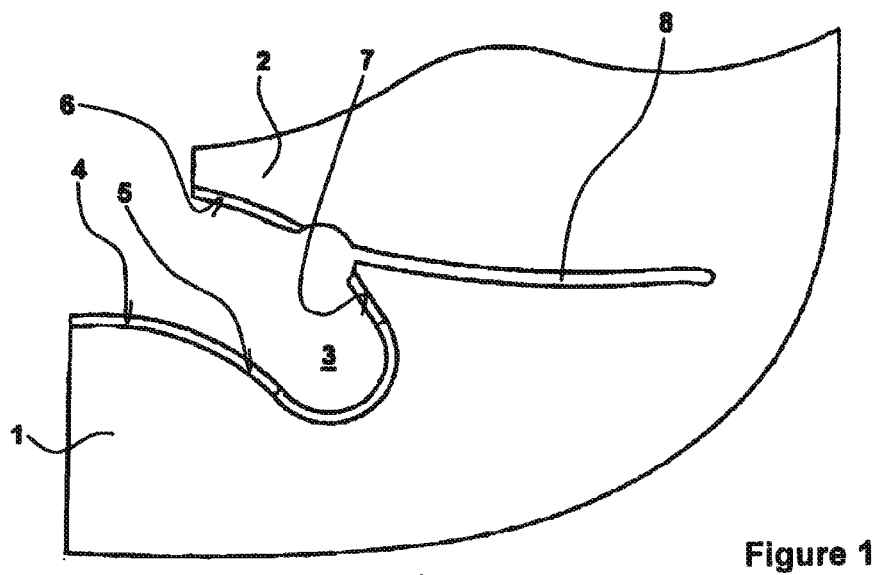
FIG. 1 shows a clamping holder according to the invention.

In FIG. 1, the entire clamping holder shown by 10 can be seen in the form of a narrow blade, of which only the relevant portion is shown here, which optionally receives a cutting insert. The clamping holder, as stated, has approximately the shape of a thin elongate plate or blade or else a rotatable disc, the thickness of the clamping holder typically being in the order of magnitude of 1 to 10 mm, while the width or height, which would have to be measured in the vertical direction in FIG. 1, is typically between 10 and 50 mm. The length (to be measured in the horizontal direction) is typically in the range of 50 to 150 mm. In particular, a rear portion of this blade of the clamping holder 10 can also be significantly thickened relative to the front portion having the recess 3.

As is seen, the clamping holder has a rigid portion 1 shown at the bottom here and a clamping finger 2 that is resiliently movable in relation to the latter. An approximately U-shaped recess 3 is defined between the clamping finger 2 and the rigid portion 1, the flanks of this U-shaped recess, in this case, being concavely curved on the one side and convexly curved on the other side. In the present case, the lower side of the U-shaped recess 3, which has contact points 4 and 5, is convexly curved and the upper side, which is substantially defined by the clamping finger with the contact point 6 and also by the contact point 7 simultaneously serving as a stop, is substantially concave, the slot 8 also opening in this concave upper side.

The rigidity of the portion 1 and the mobility of the clamping finger 2 in relation to the latter is substantially ensured by the material of the clamping holder 10 remaining above and below the end of the slot 8.

In general, clamping holders of this type are produced from tool steel.

Figure 2:
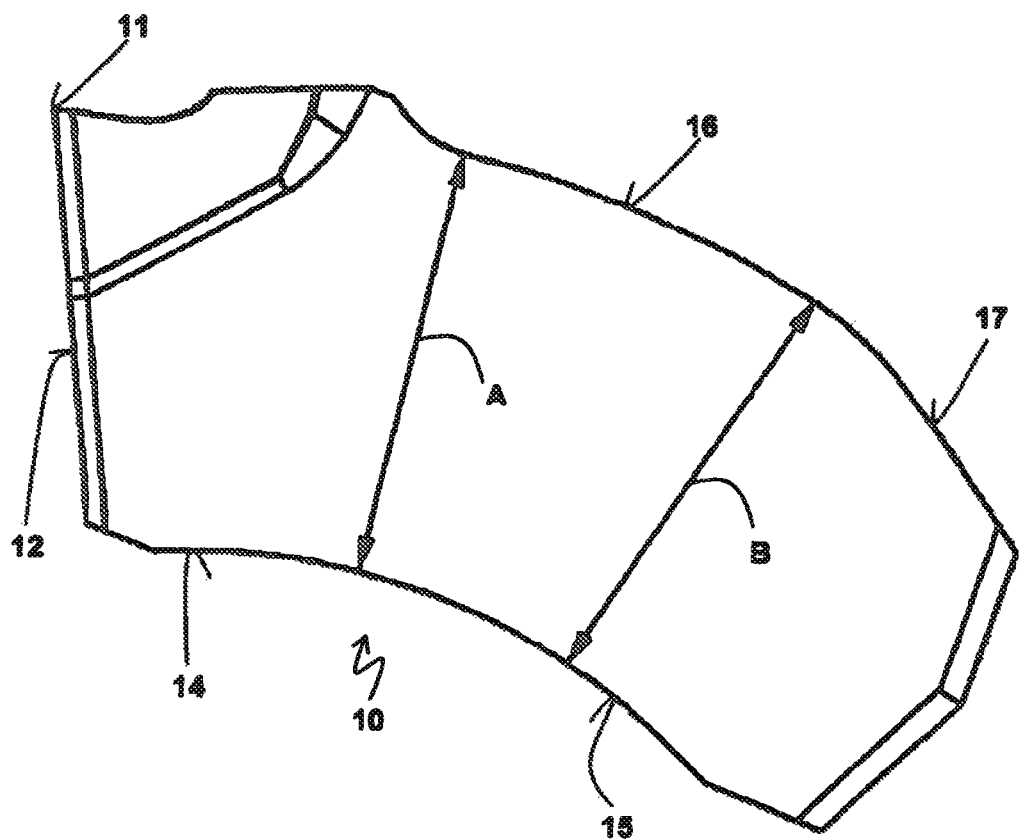
FIG. 2 shows a corresponding cutting insert.

FIG. 2 shows an associated cutting insert in the form of an insert 20, which also consists of a narrow, plate-shaped part, the upper left-hand end of which is slightly thickened and has a cutting edge 11 at the transition from the upper side to an end face. Apart from the cutting edge 11 provided at the front end, the upper side, in a portion set further back, has a contact point 16 and a further contact point 17 close to the rear, inner end of the cutting insert 20. The contact point 16 is located on the lower side of the cutting insert 20 in relation to a connecting line of the contact points 14, 15. In other words, the shortest connection from the contact point 16 to a line connecting the points 14 and 15 opens between these two points 14 and 15.

The double arrows A and B extending between equivalent points of the upper side and the lower side of the cutting insert 20 indicate that the cutting insert 20 has a slightly negative wedge shape, as the width of the cutting insert in the region of the double arrow A situated closer to the opening of the recess is slightly smaller than in the region of the double arrow B. This also applies analogously to the U-shaped recess 3. A corresponding wedge angle, which could be measured between tangents on equivalent points of the sides of the recess or of the cutting insert, would be in the range from 1 to 5°. Nevertheless, the mobility of the clamping finger 2 is sufficient to be able to insert the cutting insert 20 with its slightly wider end leading into the correspondingly spread open end of the U-shaped recess 3 (equivalent points are points on the opposing sides, the connecting line of which encloses, with the respective tangent, the same angle in a mirror-inverted manner).

With respect to the introduction of a cutting insert or cutting plate into the recess, it should be taken into account that the upper side and the lower side of the cutting insert, like the corresponding sides of the U-shaped recess 3, sectionally (perpendicularly to the paper plane in the figures) generally have a wedge-shaped or arcuate profile in order to also provide the cutting insert with a secure hold transversely to its insertion direction into the recess 3, which rules out an insertion laterally (i.e. perpendicularly to the paper plane in the figures) into the recess.

Compared to the convexly curved upper side, on which the third contact point 16 is provided, the rear portion of the upper side has an angled, level portion, which has the contact point 17 and simultaneously also the stop face of the cutting inset 20 to limit its insertion depth.

In relation to a tangent to the curved upper side directly before the bend of the stop face 17, this face is bent by an angle of 20 to 25°, this angle obviously also being able to adopt other values, typically in the range from 15 to 50°. It has to be considered here that a very small angle limits the precision of the limitation of the insertion depth, while too large an angle could lead to the fact that the face 17 could lose its effect as a fourth contact point and, on the occurrence of corresponding torques, which act by means of forces acting substantially vertically from above on the cutting edge 11 or the associated cutting face by way of the lever from there to the contact point 14, and would not offer any adequate resistance.

Angles in the range between 15 and 50° should, however, fulfil both functions adequately well, smaller angles being at the expense of the positional precision at the stop, while larger angles rather restrict the function of the abutment of the first contact point.

Figure 3:
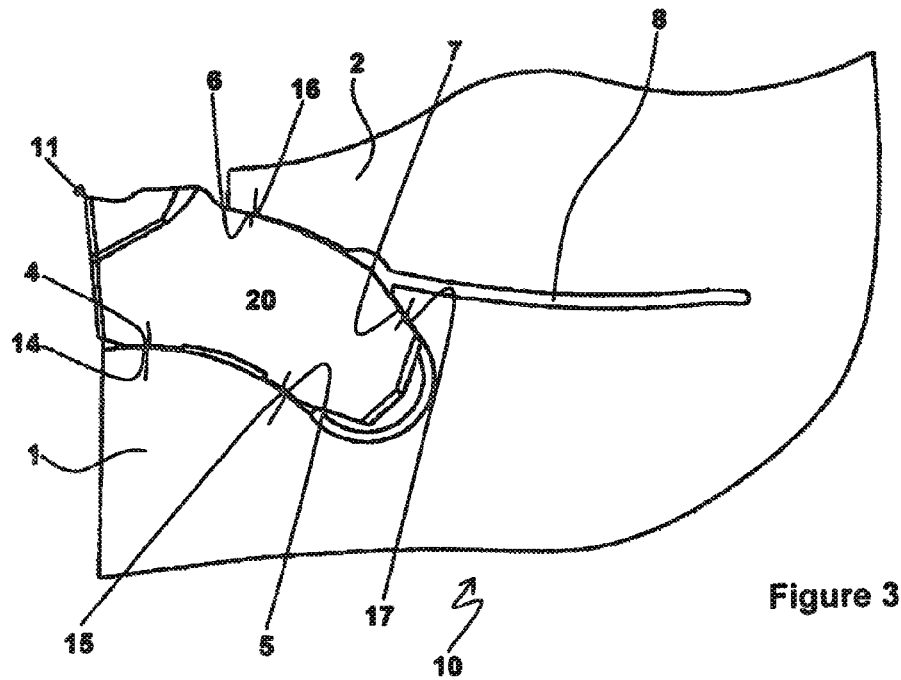
FIG. 3 shows a cutting insert received in a clamping holder.

In FIG. 3, the cutting insert 20 mounted in the U-shaped recess 3 can be seen. In FIG. 3, a variant of a cutting insert is also shown, the lower side of which has a setback portion, so the two separate first and second contact points 14, 15 are clearly defined and spaced apart from one another. The upper contact points 16 and 17 are also clearly separated from one another and spaced apart, as one of these points, namely the point 16, is provided on the clamping finger and the point 17 only comes into contact with the stop 7 in the U-shaped recess 3 after correspondingly far insertion of the cutting insert up to the end stop.

Figure 4B:
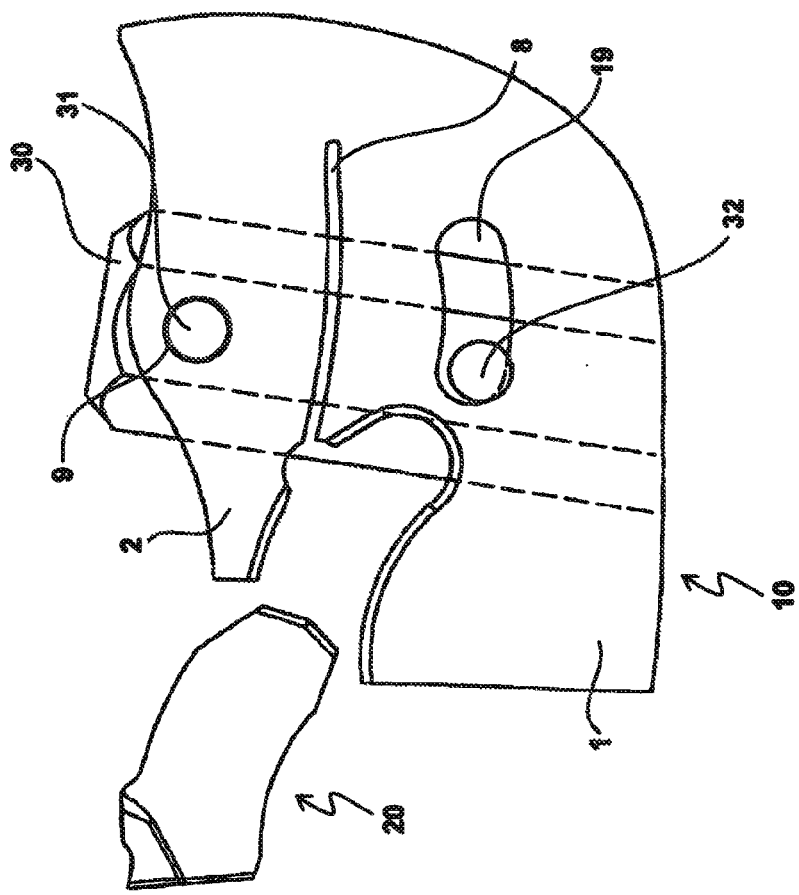

FIG. 4 additionally also shows the assembly of the cutting insert in the corresponding recess with the aid of a suitable tool. As the cutting insert, i.e. the spacing between the upper and lower side of the cutting insert, is produced with a slight excess dimension relative to the width of the U-shaped recess 3 and as, because of the quantity of material which remains above the slot 8 on the clamping finger 2, very large resilient restoring forces act on the clamping finger, a tool with a lever transmission is generally required in order to be able to open the U-shaped recess 3 adequately wide, and to be able to firmly clamp the cutting insert, especially when, as described above, the cutting insert and U-shaped recess define a slightly negative wedge shape.

For this purpose, a bore 9, which can receive a corresponding pin 31 of a tool 30, is provided in the clamping finger above the slot 8. Provided in the lower, rigid holding part is a curved elongate hole 19, the centre point of curvature of which is located slightly next to the centre point of the bore 9, which leads to the fact that a centre line of the elongate hole 19 has a varying spacing from the centre of the hole 9. The tool 30 in the form of a lever, on the one end of which two pins 31, 32 are arranged at a spacing, which allows the simultaneous receiving of the pins in the bore 9 and at at least one end of the elongate hole 19, is placed with its two pins in the bore and the elongate hole. A pivoting of the lever such that the pin 32 slides on the other end of the elongate hole 19, which has a smaller spacing from the centre of the bore 9, presses the clamping finger 2 and rigid holding part 1 slightly apart, so that in this state shown to the left in FIG. 4, the cutting insert can be inserted into the U-shaped recess.

After the renewed pivoting of the lever 30 into the starting position, as shown on the right in FIG. 4, the tool with its two pins 31, 32 can be removed from the bore 9 and the elongate hole 19 and the cutting insert is therefore firmly clamped. During the previous insertion of the cutting insert into the U-shaped recess 3, the stop face 17 at some time reaches the stop 7 and therefore limits the further insertion depth of the cutting insert into the U-shaped recess, as the relevant stop faces 7, 17 are angled relative to the insertion direction and the stop face 7 is moreover arranged on the rigid holding part 1.

The clamping holder according to the invention produces a very firm and secure clamping of the cutting insert 20 in the clamping holder 10.

For the purposes of the original disclosure, reference is made to the fact that all the features, such as become accessible to the person skilled in the art from the present description, the drawings and the dependent claims, even if they have been described specifically only in connection with specific further features, can be combined, both individually and in any desired combinations with other features or feature groups disclosed here, as long as this has not been expressly ruled out or technical details make combinations of this type impossible or pointless. The comprehensive, explicit representation of all the conceivable feature combinations and the emphasis of the independence of the individual features from one another is only dispensed with here for the sake of brevity and readability of the description.

The invention claimed is:

1. Cutting insert for grooving or cutting off, comprising an upper side and a lower side, which are configured to engage, in each case, with opposing sides of a recess, between which the cutting insert is clamped, wherein one of the sides has first and second spaced-apart contact points and the other of the two sides has a third contact point and a stop, which is spaced apart therefrom, limits an insertion depth of the cutting insert into the recess and simultaneously also acts as a further, fourth lateral contact point, wherein sides of the cutting insert are concave and convex analogously to sides of the recess, the side having two contact points being concave and the side with one contact point being convex, wherein the stop comprises a stop surface at an end of the cutting insert remote from a cutting edge, and wherein the stop surface is angled with respect to a curved course of the respective side by an amount of 15 to 50°, such that the stop simultaneously acts as a further, fourth sideward contact point, the cutting insert thus comprising four contact points.

2. Cutting insert according to claim 1, wherein either the upper side or the lower side of the cutting insert is concave and the respective other side is convex.

3. Clamping holder for cutting inserts according to claim 1, wherein the side between the first and second contact points has a setback portion in order to avoid direct contact of the relevant side with the clamping holder between the first and second contact points.

4. Cutting insert according to claim 1, wherein the recess has, when viewed in a side plane view, an end surface connecting an upper surface and a lower surface of the recess and wherein the end surface is concave.

5. Cutting insert according to claim 4, wherein the concave end surface has a U-shape.

6. Cutting insert according to claim 1, wherein the recess is U-shaped.

7. Cutting insert according to claim 1, wherein the cutting edge of the insert is located at a transition from the side of the cutting insert that is convex to a second end face.

* * * * *